United States Patent [19]
Vera et al.

[11] Patent Number: 5,742,454
[45] Date of Patent: Apr. 21, 1998

[54] UNITARY LOAD BEAM AND CAM FOLLOWER

[75] Inventors: Daniel Vera, Temecula; David Wolf, Norco, both of Calif.

[73] Assignee: Magnecomp Corp., Temecula, Calif.

[21] Appl. No.: 755,191

[22] Filed: Nov. 25, 1996

Related U.S. Application Data

[60] Provisional application No. 60/027,925 Oct. 9, 1996.

[51] Int. Cl.⁶ .............................. G11B 5/54; G11B 21/22
[52] U.S. Cl. .............................................. 360/105; 360/104
[58] Field of Search ................................ 360/104, 105

*Primary Examiner*—Robert S. Tupper
*Attorney, Agent, or Firm*—Louis J. Bachand

[57] ABSTRACT

Load beam for supporting a terminally disposed flexure carrying a head slider in operative association with a removable disk drive and an actuator for shifting the load beam along its longitudinal axis, the load beam being formed of a single member and having an integrally formed laterally projecting cam follower unitary therewith for effective lifting of the head slider from the disk.

10 Claims, 2 Drawing Sheets

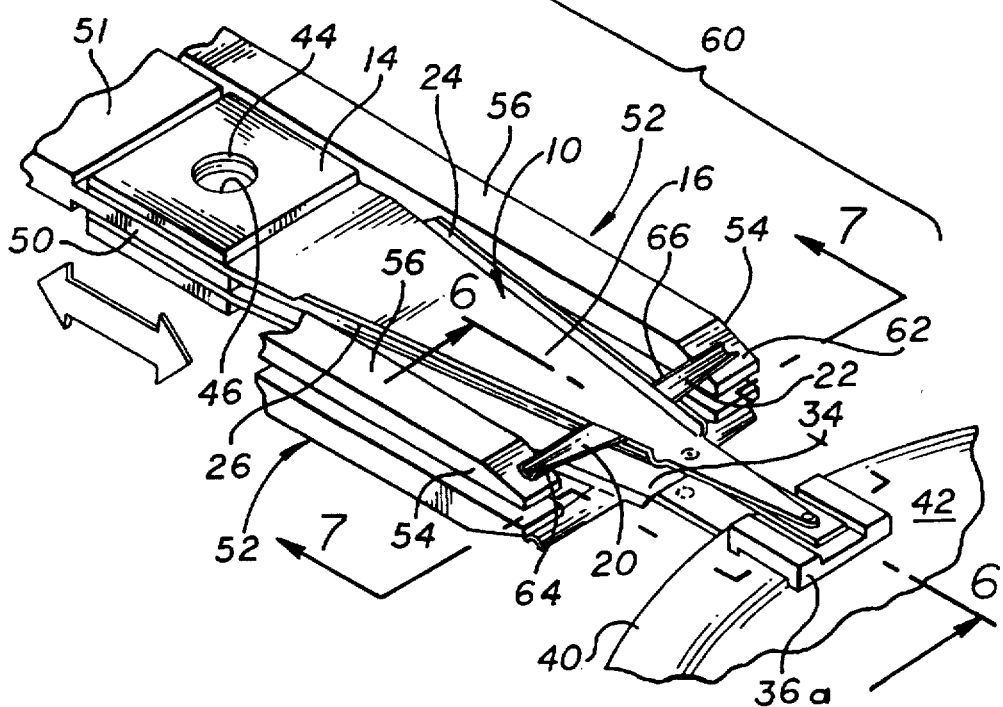
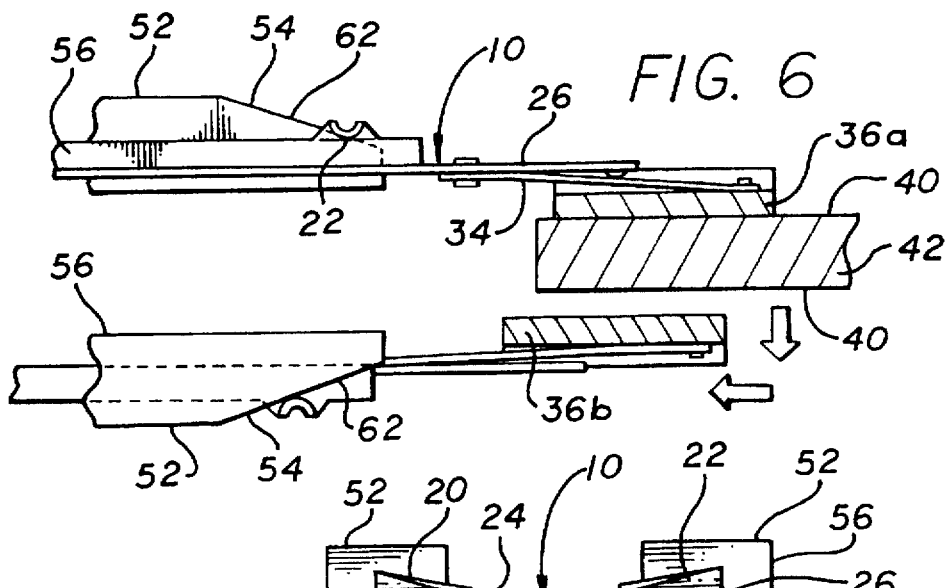
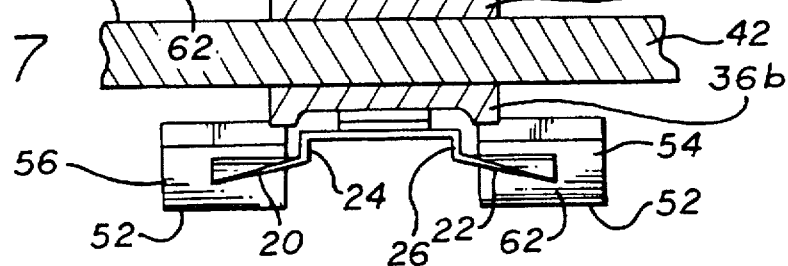

UNITARY LOAD BEAM AND CAM FOLLOWER

REFERENCE TO RELATED APPLICATION

This application claims the benefit of Provisional application Ser. No. 60/027,925, filed Oct. 9, 1996.

INTRODUCTION

This invention relates to disk drive assemblies and, more particularly, to suspensions for removable disk drives comprising a unitary load beam and cam follower formed together by progressive forming operations from a single metal member. The cam follower provides lifting capability inward of the recording head slider carried by the suspension. In a particular aspect, the invention provides a unitary liftable load beam in which the integrally formed cam follower projects laterally from the sides of the load beam typically with a decreasing radius of curvature outward from the load beam proper. The cam follower is arranged to engage a laterally adjacent camming surface to thus lift the slider from the disk drive disk.

BACKGROUND OF THE INVENTION

In disk drives with removable disks it is necessary to increase the spacing between the recording head slider and the disk to facilitate disk removal. This can be accomplished by lifting the load beam, carrying the slider away from the disk, using external cam means positioned relative to the load beam such that load beam shifting along its longitudinal axis temporarily and locally engages the load beam or a member attached to the load beam so as to exert lifting force.

BRIEF SUMMARY OF THE INVENTION

It is accordingly an object of the invention to provide a lift feature in a disk drive suspension comprising a cam follower unitary with the load beam to effect selective lifting of the beam upon engagement of the cam follower with a cam. It is another object to provide a novel suspension in which the suspension load beam is transformed rearwardly of the slider to have an integral lifting structure in the form of a curved cam follower structure which is a continued extent of the unitary metal member from which the load beam itself is formed. Still another object is to provide a unitary camming surface laterally of the suspension load beam comprising a cam follower integrally formed with the load beam in a manner to have a decreasing radius of curvature outward from the load beam.

These and other objects to become apparent hereinafter are realized in accordance with the invention in a load beam for supporting a terminally disposed flexure carrying a head slider in operative association with a removable disk drive and an actuator for shifting the load beam along its longitudinal axis, the load beam having a laterally projecting cam follower symmetrical about and unitary with the load beam.

In this and like embodiments, typically, the cam follower is located relatively forwardly on the load beam, e.g. within the last 35% of the load beam length; the load beam has rails extending normal thereto and along the sides thereof, the cam follower being formed with and projecting normally from the rails parallel to the plane of the load beam; the load beam comprises a unitary metal member having vertically disposed rails with outer edges remote from the load beam, the cam follower comprising laterally disposed left and right cam follower structures formed on the rails at the outer edges thereof; and/or the cam follower varies in radius of curvature as a function of increasing distance from the load beam in cam follower stiffening relation.

In a more particularly preferred embodiment, the invention provides a metal load beam for supporting a terminally disposed flexure carrying a head slider in operative association with a removable disk drive and an actuator for shifting the load beam along its longitudinal axis, the load beam having a laterally projecting cam follower symmetrical about and unitary with the metal load beam.

In this and like embodiments, typically, the cam follower comprises left and right cam follower structures each located relatively forwardly on the metal load beam and in opposed relation across the width of the load beam, the metal load beam has rails extending normal thereto and along the sides thereof, the cam follower structures being formed with and projecting normally from the rails parallel to the plane of the metal load beam; the metal load beam has opposed normally disposed rails with outer edges remote from the metal load beam, the cam follower structures being formed on the rails outer edges and disposed normal to the rails and parallel to the load beam in left and right laterally projecting relation; and the cam follower structures vary progressively and decreasingly in radius of curvature as a function of increasing distance from the load beam in cam follower structure stiffening relation.

The invention further contemplates in combination: The invention load beam and unitary cam follower, camming structure disposed laterally of the load beam in cam follower engageable relation, and a removable disk opposite the head, all in operative association.

The invention further contemplates in combination: The invention load beam and unitary cam follower, a flexure carried on the load beam, an actuator for the load beam, a head slider carried by the flexure, and a removable disk opposite the head, all in operative association.

The invention methods include the method of lifting a suspension-carried head relative to a removable disk, including shifting the suspension along its longitudinal axis, maintaining a camming surface laterally adjacent the suspension and adapted when engaged to lift the suspension and its carried head relative to the disk, shaping the load beam to define a cam follower unitary therewith, and engaging the camming surface with the cam follower as a function of the shifting of the suspension along its longitudinal axis, whereby the head is lifted relative to the disk.

The invention methods further include the method of fabricating a load beam including shaping a unitary, one-piece, single metal member into a load beam configuration, forming at right angles to the load beam left and right side rails having projecting continuing extents, bending the continuing extents transversely and at right angles to their respective rails so that the continued extents and the load beam lie in parallel planes, and bending the continued extents about their respective longitudinal axes to decrease their radius of curvature outward from the rails, whereby the rail continued extents define cam follower structures on the right and left sides of the load beam.

In this embodiment, typically, there is selected a single metal member comprising a work hardened 300 series stainless steel for the unitary load beam and cam follower structure, e.g. a stainless steel member having a tensile strength between about 185,000 and 240,000 psi.

BRIEF DESCRIPTION OF THE DRAWINGS

The invention will be further described in conjunction with the attached drawings in which:

FIG. 5 is an axonometric view of the cam follower in the installed condition on a disk drive suspension assembly positioned at a disk;

FIG. 6 is a view taken on line 6—6 in FIG. 5; and,

FIG. 7 is a view taken on line 7—7 in FIG. 5.

DESCRIPTION OF THE PREFERRED EMBODIMENTS

Figure 1:
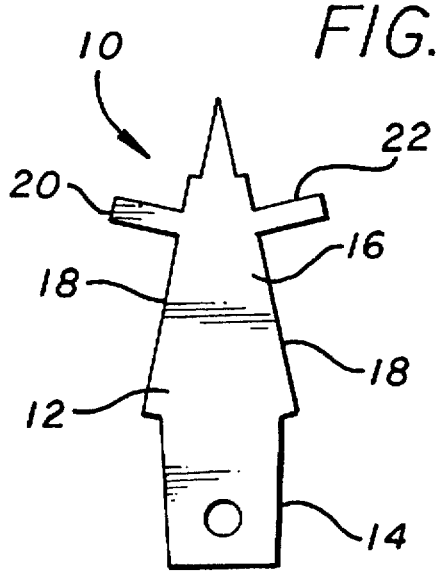
FIG. 1 is a plan view of a load beam blank with the load beam per se, the potential rails and the potential cam followers all in one plane.

This invention addresses a problem in prior art disk drive suspension devices, and particularly problems with optimization of the lift feature in removable media devices. In removable media disk drives, there is usually a feature added to the suspension to allow the use of a lifting cam. The ordinary head suspension designed for non-removable media drives does not have or need such a feature. Ideally, a lift mechanism allows the head slider to rise off the disk when retracting to the rest or park (non-operation) position and to lower onto to the disk when loading for operation. The lift mechanism is positioned such that it does not contact the head or suspension in order to assure that the head can gimbal freely as required to match the contours of the disk. In both the unload/retract and the load cycles the slider must maintain an orientation or attitude that places the air bearing surface substantially parallel to the disk. The suspension, accordingly, must receive a lift force that is symmetrical or centered on the long axis of the suspension and slider. If a twisting or rolling force is applied to the slider at load or unload, the slider may tip and its corner may touch the disk. Other requirements for the optimum lift feature include minimum cost, mechanical ruggedness, avoidance of occasions for assembly operator error, few to no loose parts that can become lost or even fall into the assembly, ease of manufacture within existing manufacturing operations, and fewest added manufacturing steps.

In the present invention these ideal criteria are substantially achieved. The invention lift feature for a removable media disk drive provides symmetrical lift by having simultaneous lift on both sides using protruding cam follower structures in a plane transverse to the longitudinal axis of the suspension load beam. Manufacturing ease is achieved by incorporating formation of the protruding structures with the formation load beam itself using the same metal blank from which the load beam is formed. There are no loose pieces of material, no bonding, no interfitting of small parts and the result is an efficiently produced, operationally effective suspension with integral lift feature. The protruding cam follower structure gains added strength and a highly suitable camming surface by forming it on a die imparting a cam surface such as a parabolic surface for the lift cam to engage for easy sliding without interference.

With further reference to the invention, a removable media disk drive assembly typically comprises a pair of upper and lower of head sliders carried on a pair of suspensions identical except for position, and each comprising a flexure supported by a load beam at the outer end thereof in cantilevered relation. The upper and lower head sliders are operatively associated with upper and lower surfaces of a removable media disk drive disk. The disk drive assembly may be of the single disk type or have a plurality of disks. The load beams are fixed to the tongue of an actuator which drives the slider heads across each respective disk by longitudinally shifting the load beam back and forth. The very close proximity of slider heads to the surfaces of the disks is such that the disks cannot be removed without damaging contact with the heads unless the heads are lifted slightly beforehand. The invention provides a lightweight, readily fabricated, assembly-error free slider head lift for lifting the heads.

The invention lifts comprise cam followers in the form of cam follower structures which project from the load beam, and which, uniquely, are fabricated from and with the load beam, e.g., as a pair of outrigger arms unitary with the load beam, i.e. made from a single, unitary, integral, non-articulated and non-sectioned member of the same piece of material, such as a metal, including especially a 300 series stainless steel, e.g. 303 or 304 stainless steel, work-hardened for the desired rigidity and toughness, or other suitably rigid member. The unitary member will suitably be capable of undergoing the forming steps previously mentioned and hereinafter described, or capable of being otherwise shaped, e.g. by casting or molding directly, to the desired form. The unitary member when formed will have its cam follower structures such as outrigger arms with a surface complementary to their purpose which is to slide easily relative to the camming structure, and thus should have a coefficient of friction which provides this property, either inherently or after surface treatment. The unitary member when shaped to form the cam follower structure arms also should have there a curvature providing a camming surface such that the engagement of the cam follower structure and the member camming surface will gently and positively provide the desired lift of the slider heads in cooperation with the camming structure moved against the unitary member surface. As noted above, the unitary member comprises both the load beam and the cam follower structures in unitary relation.

Figure 2:
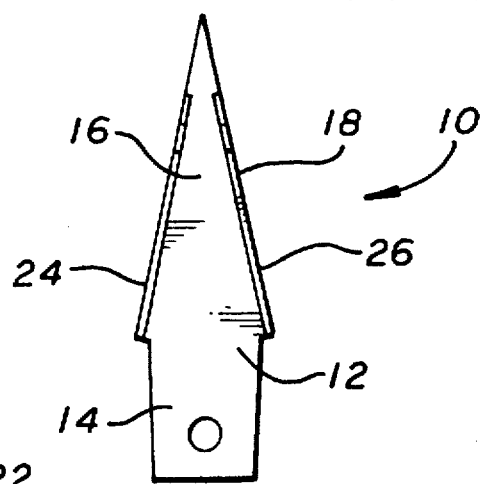
FIG. 2 is a view of the load beam blank after forming rails at right angles to the plane of the load beam.
Figure 3:
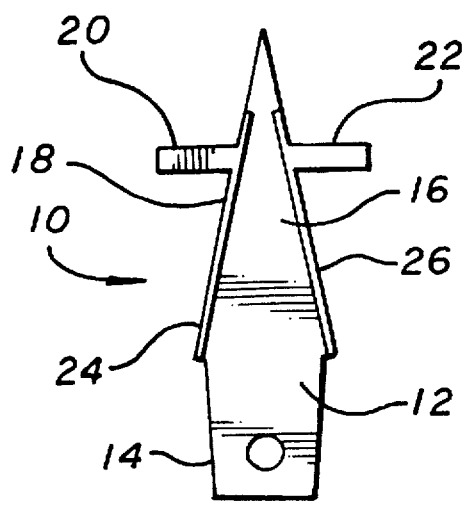
FIG. 3 is a view of the load beam blank after forming the cam followers at right angles to the plane of the rails and parallel with the plane of the load beam.
Figure 4:
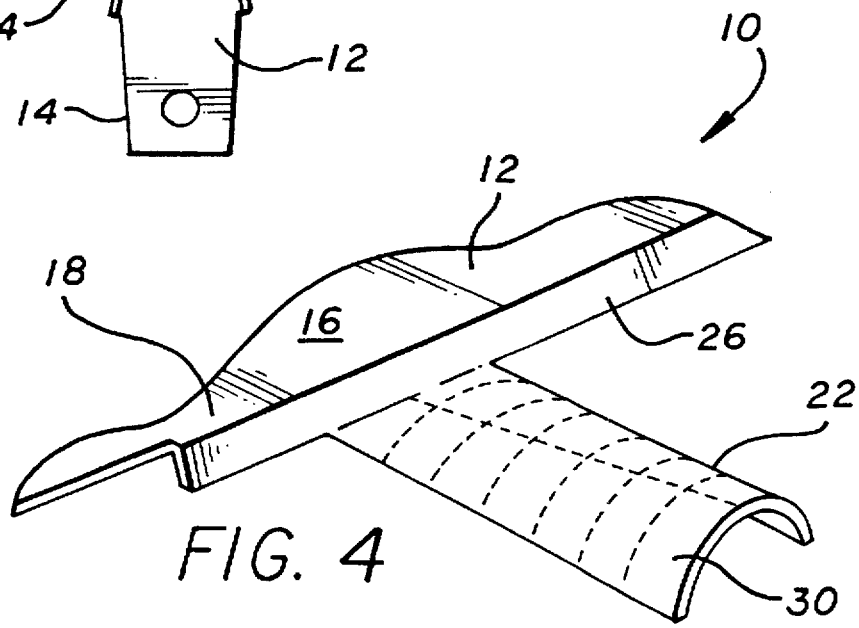
FIG. 4 is a fragmentary perspective view, somewhat enlarged, of the cam follower attached to the load beam at the rail thereof.

With reference now to the accompanying drawings, particularly to FIGS. 1–4, the progressive shaping of the unitary load beam 10 is illustrated without showing the dies being used for forming. A single, planar metal member 12 shown in FIG. 1 is preblanked to the load beam 10 shape shown including a generally rectangular base portion 14, a generally triangular forward portion 113 having right and left edges 18, and a pair of integral arms 20, 22 projecting as continued extents of the member forward portion edges 18 which will become the cam followers ultimately. In FIG. 2, the member forward portion edges 18 are bent upward to define rails 24, 26 which are normal to or at right angles to the plane of the member forward portion 16. In FIG. 3, the arms 20, 22 are bent at their junction with the rails to lie at right angles to the rails 24, 26, and to lie in a plane parallel to the general plane of the member 12. In FIG. 4, the arm 22 is shown curved on its longitudinal axis with a progressively decreasing degree of curvature from flat or planar at the rail 26 (at the locus of folding) to the outermost portion 30 of the arm providing a surface which is gently curved for easy riding of a camming structure thereon for lifting purposes.

With reference to FIGS. 5–7, the load beam 10 at its forward or distal portion 16 is adapted to carry a flexure 34 from which head sliders 36a, 36b gimbal in operating proximity with the upper or lower surface 40 of disk 42. The proximate or base portion 14 of the load beam 10 has an opening 44 adapted to be swaged onto a boss 46 carried by tongue 50 of actuator 51, see FIG. 5. Camming structures 52 comprising shiftable camming ramps 54 are arranged parallel to the load beam 10 and alongside the forward portion 16 thereof. The camming ramps 54 comprise fingers 56 supported by the disk drive assembly 60, the fingers having outwardly sloped surfaces 62. Arms 20, 22 define cam follower structures 64, 66 integral with the load beam 10, formed unitarily in the member 12 and from the same piece of material, e.g. metal, as the load beam 10 and its identified parts including the base portion 14, the forward portion 16, the rails 24, 26, and the arms 20, 22. The cam follower structures 64, 66 are opposed to and lie in the plane of the camming ramps 54. Longitudinal shifting outward of the load beam 10 by actuator 51 brings the integral cam follower structures 64, 66 into sliding contact with camming surfaces 62, and forces the cam followers upward (relatively from upper disk surface 40) and downward (relatively from the lower disk surface 40). Preferably, the camming action is pro,tided by a pair of camming ramps 54 positioned at either side of the load beam 10.

The form of cam follower structure disclosed herein is advantageous in providing optimally all of the conventional features of an effective lift structure, including absence of contact with the head or suspension in order to assure that the head can gimbal freely as required to match the contours of the disk, and maintenance of a slider orientation or attitude that places the air bearing surface substantially parallel to the disk, as well as enabling a lift force that is symmetrical or centered on the long axis of the suspension and slider free of tipping in response to a twisting or rolling force applied to the slider at load or unload and corner contact with the disk. The disclosed invention structure, withal, is produced at minimum cost, has mechanical ruggedness, does not present occasions for assembly operator error, has no loose parts that can become lost or fall into the assembly, is easily manufactured without resort to novel manufacturing operations, and has the fewest added manufacturing steps of any load beam idea with which applicants are familiar.

The invention thus provides a lift feature for a removable media disk drive suspension in which the suspension load beam is modified to include a unitary lifting structure to provide a cam follower structure on the load beam, so that longitudinal axial shifting of the suspension load beam engages its unitary cam follower with the camming structures and lifts the slider head relative to the disk drive disk, permitting disk removal without added structure being appended onto the suspension. The foregoing objects of the invention are thus met.

What is claimed is:

1. Load beam for supporting a terminally disposed flexure carrying a head slider in operative association with a removable disk drive and an actuator shifting said load beam along its longitudinal axis, said lead beam having a laterally projecting cam follower symmetrical about and unitary with said load beam, said cam follower varying in radius of curvature as a function of increasing distance from said lead beam in stiffening relation.

2. Load beam according to claim 1, in which said cam follower is located relatively forwardly on said load beam.

3. Load beam according to claim 1, in which said load beam has rails extending normal thereto and along said sides thereof, said cam follower being formed with and projecting normally from said rails parallel to said plane of said load beam.

4. Load beam according to claim 1, in which said load beam comprises a unitary metal member having vertically disposed rails with outer edges spaced from said load beam, said cam follower comprising laterally disposed left and right cam follower structures formed on said rails at said outer edges thereof.

5. In combination: said load beam and cam follower of claim 1, camming structure disposed laterally of said load beam in cam follower engageable relation, and a removable disk opposite said head, all in operative association.

6. In combination: said load beam and cam follower of claim 1, a flexure carried on said load beam, an actuator for said load beam, a head slider carried by said flexure, and a removable disk opposite said head, all in operative association.

7. A metal load beam for supporting a terminally disposed flexure carrying a head slider inoperative association with a removable disk drive and an actuator for shifting said load beam along its longitudinal axis, said load beam having a laterally projecting cam follower symmetrical about and unitary with said metal load beam, said cam follower varying progressively and decreasingly in radius of curvature as a function of increasing distance outward from said load beam in cam follower stiffening relation.

8. Load beam according to claim 7, in which said cam follower comprises right and left cam follower structures each located relatively forwardly on said metal load beam in opposed relation across said width of said load beam.

9. Load beam according to claim 8, in which said metal load beam has rails extending normal thereto and along said sides thereof, said cam follower structure being formed with and projecting normally from said rails parallel to the plane of said metal load beam.

10. Load beam according to claim 9, in which said metal load beam has opposed normally disposed rails with outer edges remote from said metal load beam, said cam follower structure being formed on said rail outer edges and disposed normal to said rails and parallel to the load beam in laterally projecting relation.

* * * * *